July 6, 1937.  R. R. NYDEGGER  2,085,994
CONTROL MEANS FOR MECHANICAL REFRIGERATORS
Original Filed Oct. 24, 1932   3 Sheets-Sheet 1
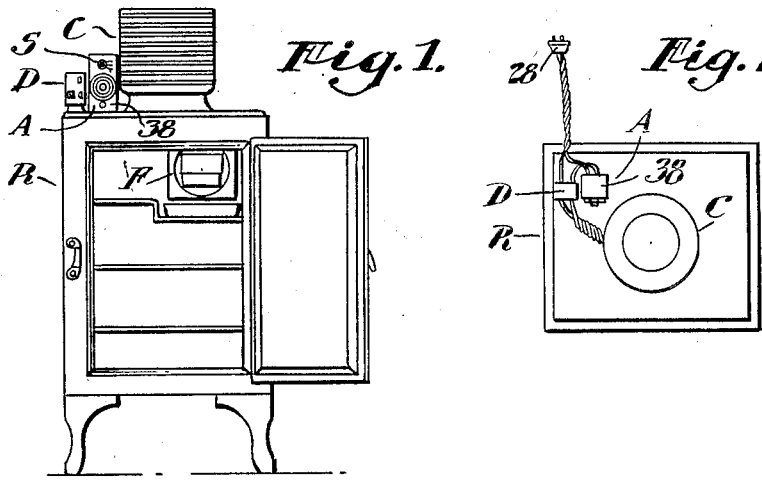
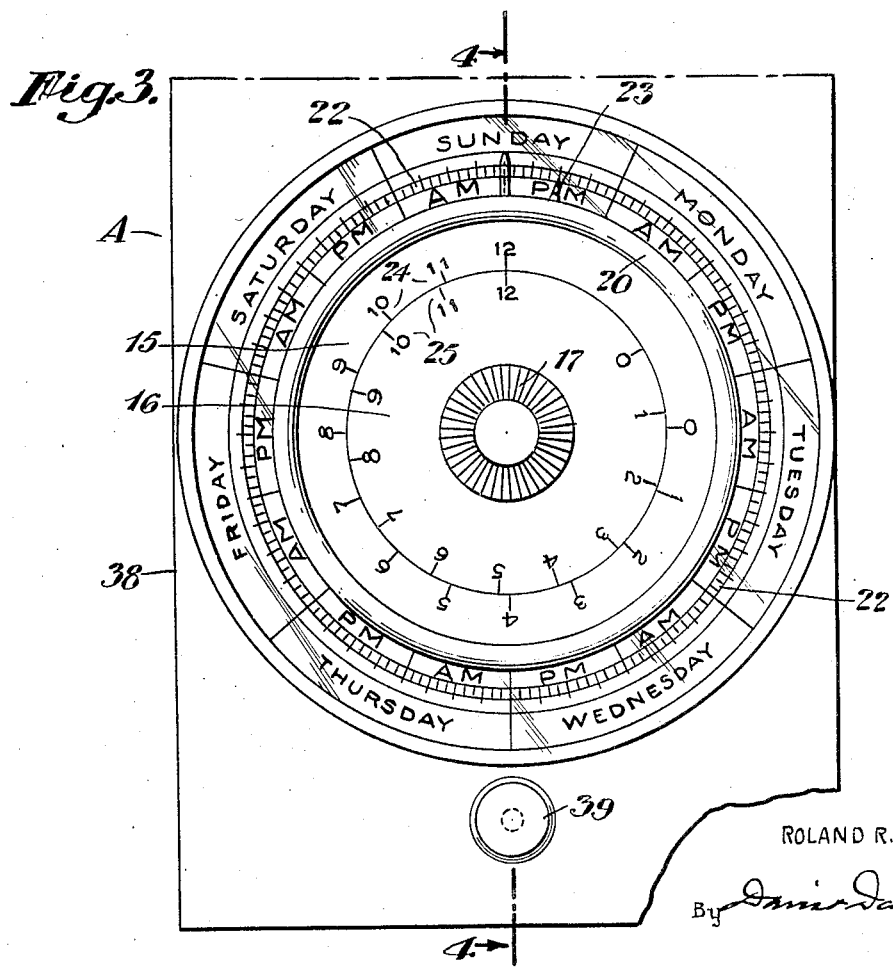
Inventor
ROLAND R. NYDEGGER
By
Attorneys

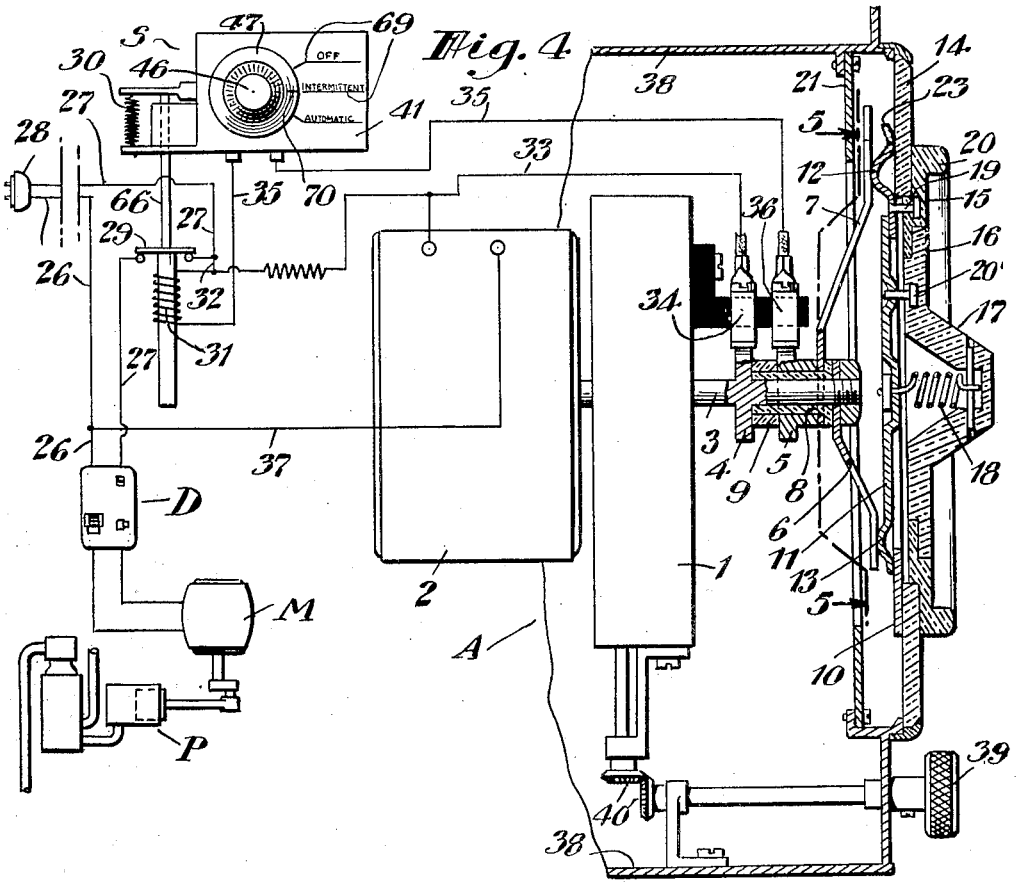
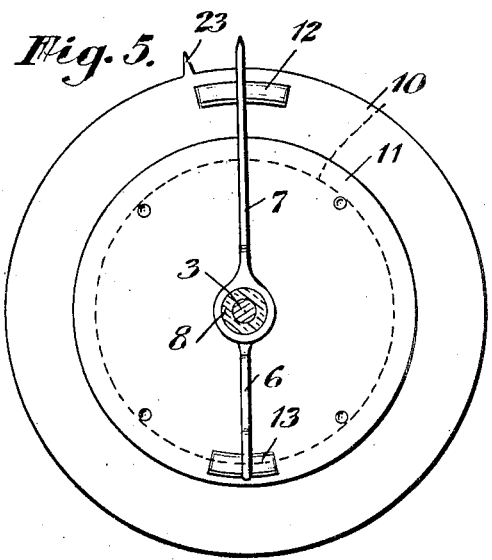
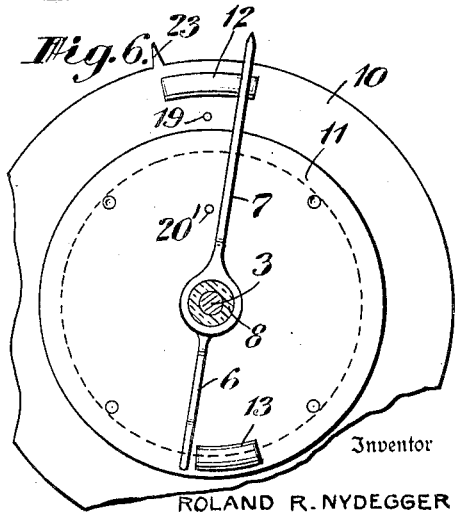
Inventor
ROLAND R. NYDEGGER
By Davis Davis
Attorneys

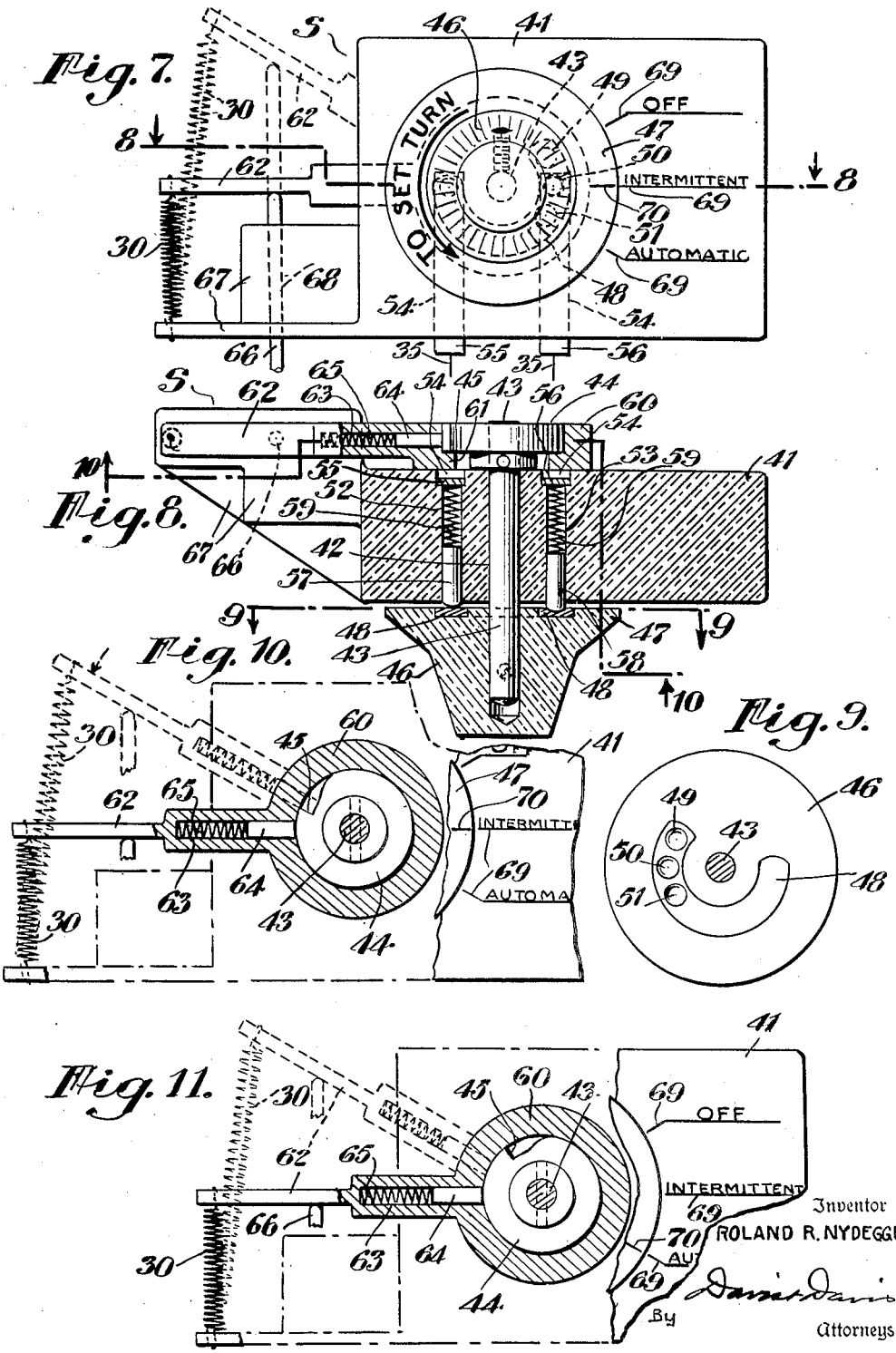

Patented July 6, 1937

2,085,994

UNITED STATES PATENT OFFICE 2,085,994

CONTROL MEANS FOR MECHANICAL REFRIGERATORS

Roland R. Nydegger, Wilmington, Del.

Application October 24, 1932, Serial No. 639,243
Renewed November 21, 1936

15 Claims. (Cl. 161—1)

This invention relates more particularly to an improvement in a refrigeration control apparatus disclosed in my co-pending application, Serial No. 626,012, filed July 29, 1932 and also in my co-pending application, Serial No. 664,321 filed April 4, 1933. Said apparatus was devised to automatically interrupt the operation of a mechanical refrigerator at a pre-selected time and for a pre-determined duration, according to an adjustment of the apparatus, to permit the ice to melt from the freezing unit of the refrigerator.

An important object of the present invention is to provide an adjustable cut-off device for co-operation with such an automatic control apparatus, said cut-off device being pre-adjustable to permit automatic recurrent interruption of the refrigeration at regular intervals by the automatic apparatus and pre-adjustable also to prevent such recurrent interruption and limit said apparatus to a single interruption at a pre-determined time.

Other objects of the invention will appear hereinafter.

In the drawings, Fig. 1 is a front view of a standard form of electrical refrigerator equipped with the control apparatus and cut-off device;

Fig. 2, a top plan view of said combination;

Fig. 3, a front view, upon a larger scale, of the means for setting the automatic control apparatus;

Fig. 4, a vertical section on the line 4—4 of Fig. 3 and showing diagrammatically the operative connections of the cut-off device with the automatic control apparatus and the operative connections of said apparatus with the mechanism of the refrigerator which circulates the freezing fluid;

Fig. 5, a section on the line 5—5 of Fig. 4 showing the cooperation of the clock-driven electrical contacts with the manually adjustable contacts to interrupt the refrigeration;

Fig. 6, a view similar to Fig. 5 showing one of the contacts adjusted to vary the period of interruption;

Fig. 7, a front view of the cut-off device;

Fig. 8, a section on the line 8—8 of Fig. 7;

Fig. 9, a section on the line 9—9 of Fig. 8;

Fig. 10, a section on the line 10—10 of Fig. 8 showing the automatic cut-off operation of the device; and Fig. 11, a view similar to Fig. 10 showing the device adjusted to prevent automatic cut-off.

The automatic control apparatus, designated A, is illustrated in connection with a commercial form of electrically operated refrigerator R having mounted upon the top of its cabinet a bank of condensing coils C for the refrigerant fluid and a compressor unit enclosed by said bank and comprising an electric motor M and a pump P driven by said motor, as shown diagrammatically in Fig. 4. The pump has the usual fluid connections, not shown, with the condenser coils and with the freezing unit F to withdraw the refrigerant fluid from the freezing unit, compress the fluid, deliver it to the coils and thence back to the freezing unit. Ordinarily the operation of the motor M is controlled by a control device D which includes a manually operable switch to open and close the motor circuit, a thermostat to start and stop the motor in response to temperature changes in the freezing unit when said switch is closed, an overload protective device and a starting relay. My invention involves no change in this control device and detailed illustration of the latter is thought to be unnecessary. My automatic control device is connected in circuit with the standard control device D in a manner to enable either device to be operated without interference from the other. The cut-off device is in the form of an adjustable switch mechanism S electrically connected to the automatic apparatus for cooperation therewith, as will be described hereinafter.

The automatic control device includes a clock mechanism 1 driven by an electric motor 2. The clock mechanism may be of any suitable form and it is thought to be unnecessary to illustrate it in detail. It has an arbor 3 which is rotated one full turn in a week's time by the motor-driven mechanism. Two disk-like electrical contacts 4 and 5 are fixed to rotate with the arbor. Also fixed to rotate with the arbor are two radially extending contact fingers 6 and 7. These fingers are disposed in permanent diametrical relation. The finger 6 is electrically connected, through the arbor, with the contact 4. The contact 5 and finger 7 are electrically connected with each other, but insulated from the arbor, the contact 4 and the finger 6 by insulation sleeves 8 and 9.

In advance of the contact fingers 6 and 7 are two metal electrical contact plates 10 and 11. Plate 10 is of flat annular form and has a raised arcuate portion at its rear face forming a contact 12 engageable by the contact finger 7. Plate 11 is of circular disk form and its edge margin bears against the rear face of the plate 10 around the margin of the aperture therein. Plate 11 also has a raised arcuate portion forming an electrical contact 13 engageable by the contact finger 6. The plates are disposed concentric with the axis of the arbor and the arcs of the plate contacts 12 and 13 subtend the same angle around said axis. In the present instance said angle is that through which the arbor and the radial contact fingers are rotated in a period of twelve hours. The angle may be varied, however.

Directly in advance of the contact plates 10 and 11 is a circular glass panel 14 having a central circular aperture. An annular dial plate 15 bears against the forward face of said panel and has a circular relieved portion rotatably fitted in the panel aperture. A circular dial plate 16 of less diameter than plate 15 is rotatably mounted on the latter and the inner edge of the plate 15 and the outer edge of the plate 16 have a rabbeted interfit, with the plate 16 forwardly overlapping the plate 15. Centrally the plate 16 has a forwardly projecting knob 17 for rotating it. The knob is hollow and within it is a fore-and-aft tension spring 18 having its forward end anchored to the knob and its rear end anchored to the contact plate 11. The tension of said spring holds the plate 11 in frictional engagement with the plate 10, holds the dial plate 16 in frictional engagement with the dial plate 15 and holds the contact plate 10 and the dial plate 15 in frictional engagement with the glass panel 14, to yieldably resist rotation of said parts. The dial plates are made of insulating material. A pin 19 locks the plates 10 and 15 to rotate together, and the plate 15 has a forwardly projecting bead 20 around its outer edge to grasp for turning said plates. Another pin 20' locks the plates 11 and 16 to rotate together. All of the plates are concentric with the axis of the clock arbor. By rotation of both dial plates and their connected contact plates in unison the contacts 12 and 13 are positioned so that the contact fingers 6 and 7 will engage them at a selected time, and by rotation of the dial plate 16 and its connected contact plate 11 independently of the other plates, the contact 13 is shifted relatively to the contact 12 to vary the duration of contact of the fingers with the contacts 12 and 13 simultaneously. These adjustments will be described more specifically hereinafter.

Back of the contact plates 10 and 11 is a dial plate 21 bearing a circular time scale 22 visible through the glass panel and over the edge of the dial plate 15. This scale has graduations and designations for the days of the week, and graduations indicating the hours of each day. The contact finger 7 is extended to form a hand or pointer traversing the scale, and the contact plate 10 has a pointer 23 selectively registerable with any of the scale graduations to pre-select the day and hour of the de-icing period.

The degree of rotation of the dial plate 16 relatively to the dial plate 15 is indicated by two circular scales 24 and 25, on plates 15 and 16 respectively. Scale 24 has a series of equally spaced graduations numbered from "0" to "12". Scale 25 also has a series of graduations similarly numbered but with the space therebetween exceeding the space between the graduations of scale 24 by an angular extent around the axis of the arbor equal to one-twelfth of the angle subtended by the arcuate contact 12 or by the contact 13. Therefore, when corresponding numbers of the two scales are registered the contact fingers 6 and 7 will remain in simultaneous engagement with the contacts 12 and 13 for a number of hours corresponding to the numbers in register. When the zeros of the two scales are in register the contact 13 is so positioned with relation to contact 12 that the contact fingers cannot simultaneously engage both contacts. This adjustment is made to prevent automatic de-icing.

The motor M of the refrigerator has a circuit including two wires 26 and 27 joined to a plug 28 for connection to line wires. Wire 26 leads through the control device D to the motor M. Wire 27 has a switch 29 normally held closed by a spring 30 and adapted to be opened by the automatic control device. From said switch, wire 27 leads through the ordinary control device D to the motor. The switch 29 is opened against the spring resistance by a solenoid 31 controlled by the automatic device and also by the cut-off switch device S. One end of the solenoid coil has a circuit connection 32 with wire 27 and also a connection 33 with a brush 34 in engagement with the contact 4 on the clock arbor. The other end of the solenoid coil has a circuit connection 35 with a brush 36 in engagement with the contact 5 of the arbor. The cut-off switch device S is connected into the circuit connection 35 to open and close the latter, as will be described hereinafter. The clock motor 2 has a circuit connection 37 with the wire 26 at a point in advance of the control device D and a circuit connection with the wire 27 through the connection 33. The automatic control device and the switch 29 are preferably enclosed in a suitable casing 38 to form a compact unit.

When no de-icing period has been selected the zeros of the dials 15 and 16 are in register and the contact 13 is then so disposed with relation to the contact 12 as to prevent simultaneous engagement of the contact fingers 6 and 7 with said contacts. The automatic control device is then incapable of closing the circuit of the solenoid 31 so that the switch 29 is held closed by its spring and the motor M is operated, subject to the control device D. The clock motor 2 is operated through its circuit connection independently of both the control device D and the automatic control device and the hand 7 of the clock traverses the dial 22 without interruption. At the front of the casing 38 is a rotatable knob 39 having gear connections 40 with the clock mechanism for setting the hand when necessary.

To pre-select a time to interrupt the operation of the refrigerator and allow an accumulation of ice to melt from the freezing unit, the dial 15 is rotated to bring the pointer 23 of its connected contact plate 10 into register with the designation of the selected day on the dial 22 and also into register with the mark of the hour selected for the conclusion of the de-icing period. Then, the duration of the de-icing period is predetermined by rotating the central dial 16 relatively to dial 15 to bring the desired hour numbers on said dials in register. When the clock-driven contact fingers 6 and 7 engage both the contacts 12 and 13 the contact fingers will be electrically connected through the plates 10 and 11 to close the solenoid circuit and open the switch 29, assuming that the switch device S has been adjusted to close the connection 35, as will be described hereinafter. The contact fingers 6 and 7 will remain in simultaneous contact with their respective contacts 13 and 12 for the number of hours indicated by the registering numbers, and the switch 29 will be held open by the solenoid for that period and the control circuit of the motor M will be broken. When either of the contact fingers moves out of engagement with its respective contact the solenoid circuit is broken and the switch 29 is closed by its spring to start the motor. In Fig. 3 the dials 15 and 16 are shown adjusted for de-icing period to occur on Sunday. The pointer 23 is shown adjusted for the conclusion of the de-icing period at 6 P. M. Sunday and the "12" of dial 16 is in register with the "12" of dial 15. The re-icing period will then continue for twelve hours, from 6 A. M. to 6 P. M. The dials may remain set for automatic recurrence of the de-icing period on the same day of successive weeks or they may be re-set to select a convenient day and a convenient hour when refrigeration is not required. The automatic device is readily cut out of service when the de-icing period has not been decided upon by merely turning the central dial 15 to register its "0" with that of the dial 16. It may also be cut out of service by the cut-off switch device, as will be explained hereinafter.

The automatic device just described is disclosed and claimed in my co-pending application, Serial No. 626,012, filed July 29, 1932. The device is fully shown and described in the present application in order to make clear its cooperation with the cut-off device S.

The cut-off switch device S is a simple, compact unit which may be mounted in the casing 38 of the automatic device or in any convenient location. Its structure includes a block 41, of hard fiber or other suitable insulating material, forming a support for all of the working parts of the device. The block has a bore 42 opening through its front and rear faces, and a shaft 43 is rotatably mounted in said bore. A ratchet wheel 44, with a single notch 45, is fixed to said shaft, at the rear face of the block. At the front face of the block a knob 46 of insulating material is fixed to the shaft and has an integral dial flange 47 disposed close to the block face. At its inner face the flanged portion of the knob has an arcuate metal contact plate 48 imbedded therein. This plate is concentric with the shaft and has three depressions 49, 50, and 51.

At opposite sides of the shaft-receiving bore the block 41 has two bores 52 and 53 parallel with the bore 42 and opening through the front face of the block. The rear ends of said bores 52 and 53 open into two vertical grooves 54 formed in the rear face of the block. Two metal contact bars 55 and 56 are secured in said grooves in positions inset from the rear face of the block. Metal contact plungers 57 and 58 with rounded forward ends are slidably fitted in the bores 52 and 53 and springs 59 are disposed in said bores between the contact bars and the plungers and force the latter outward into contact with the adjacent face of the knob. These springs electrically connect the plunger 57 to the contact bar 55 and the plunger 58 to the contact bar 56.

A ring 60 is rotatably fitted on the ratchet wheel 44 and has a flange 61 engaging the inner face of the ratchet wheel to hold the ring thereto. The ring has a radially extending arm 62 formed with an inwardly opening radial bore 63 in which a ratchet plunger 64 is slidably fitted. A spring 65 in said bore presses the plunger against the periphery of the ratchet wheel. Outwardly of the bore the radial arm has a flattened portion which directly overlies the upper end of the extended core or rod 66 of the solenoid 31. At one end the block 41 has a base extension 67 formed with a vertical bore 68 in which the upper end portion of the rod 66 is slidably fitted. The spring 30 is connected to said base extension and to the radial arm and holds the latter in engagement with the upper end of the solenoid rod.

At its front face the block 41 has three marks 69 spaced around the edge of the knob dial flange 47 and the latter has an index mark 70 registerable with any one of said marks by rotating the dial. One of said marks is labelled "Off", another "Intermittent" and the third "Automatic". The angular spacing of the marks around the shaft axis corresponds to the spacing of the depressions 49, 50, and 51 in the contact plate at the back face of the knob dial.

The cut-off device is operated as follows: Assume that it is desired to leave the operation of the refrigerator under the control of the automatic device A for automatic recurrent interruption of refrigeration on the same day and hour of successive weeks, according to an original setting of the dials of the automatic device A. For this result, the knob 46 of the cut-off device is turned to register its index mark with the fixed mark labelled "Automatic". This adjustment brings the arcuate knob contact plate 48 into contact with both of the contact plungers 57 and 58 and the depression 49 on said arcuate contact plate is so located as to register with the plunger 58. The rounded end of the latter snaps into said depression and holds the adjustment. The electrical circuit connection 35 of the solenoid coil has two sections one electrically connected to the contact bar 55 and the other to the bar 56. Said adjustment closes the connection 35 through the bars 55 and 56, the springs 59, the plungers 57 and 58 and the arcuate contact plate 48. Thereby the automatic control device is permitted to close the solenoid circuit recurrently on a pre-selected day of the week and hour of the day as previously described.

When the interruption period occurs the solenoid rod 66 is elevated and it rocks the radial arm 62 and ring 60 about the ratchet wheel 44. The latter is so positioned on its shaft as to dispose its single ratchet notch 45 out of the path of the ratchet plunger 64 when the knob is in its "automatic" adjustment, as shown in Fig. 11. At the conclusion of a de-icing period the solenoid rod 66 lowers and the spring 30 rocks the arm 62 and plunger 64 downward but with no rotative effect on the ratchet wheel. Therefore the arcuate contact plate remains in engagement with both of the contact plungers 57 and 58 to permit subsequent interruptions of refrigeration by the automatic device.

When it is desired to prevent recurrent interruption of the refrigeration at regular intervals and limit the operation of the automatic device to a single interruption at a pre-selected time the knob of the cut-off device is rotated to bring its index mark into register with the fixed mark labelled "Intermittent". In this adjustment the depression 50 of the arcuate contact plate 48 is brought opposite the plunger 58 and the latter snaps into said depression and retains the adjustment. The arcuate contact plate is of sufficient length to connect both of the plungers 57 and 58 in this adjustment also. Thereby the solenoid connection 35 is completed, to permit the automatic device to interrupt the refrigeration at the pre-selected time. At the conclusion of the single de-icing period, however, said adjustment is changed and the connection 35 is broken.

The automatic breaking of the connection 35 is effected as follows:

The "intermittent" adjustment of the cut-off device disposes the notch 45 of the ratchet wheel in the path of the ratchet plunger 64, as shown in Fig. 10. Therefore, when the solenoid bar 66 rises at the beginning of a de-icing period and rocks the radial arm 62 and plunger 64 upward, the plunger at the end of its upward travel snaps into the ratchet notch 45 to lock the radial arm to the ratchet wheel. Then when the solenoid rod descends at the conclusion of the de-icing period the spring 30 rocks the radial arm downward and rotates the ratchet wheel, the shaft 43 and the knob 46 until the index mark on the knob registers with the fixed mark labelled "Off" and the contact plunger 58 is snapped into the depression 51 of the arcuate contact plate 48. Said plate in this position is out of contact with the contact plunger 57 and the electrical connection 35 of the solenoid circuit is thereby broken. This prevents recurrent interruption of the refrigeration by the automatic device. It will be understood that the "off" adjustment of the cut-off device may also be made by turning the knob manually.

It is often inconvenient to have the de-icing periods occur on the same day and hour of successive weeks. In that case automatic recurrence of the de-icing period may be prevented by a simple pre-adjustment of the cut-off device.

What I claim is:

1. A switch device comprising a switch rotor including a shaft, a knob on said shaft for rotating it, an electrical contact on the rear face of said knob and extending around the shaft, and a ratchet wheel fixed to said shaft and having a single ratchet notch; a pair of spaced electrical contacts located back of said knob and spring-urged forward to engage said knob contact to close a circuit therethrough; a rockable ratchet device to engage said ratchet notch and rotate the rotor; means to rock said ratchet device, the rotor being rotatably adjustable manually by the knob to three positions including a circuit-breaking position disposing said knob contact out of contact with one of the spring-urged contacts, a circuit-closing position disposing the knob contact in engagement with both spring-urged contacts and the ratchet notch disposed out of the path of the ratchet device, and a circuit-closing position disposing the knob contact in engagement with both spring-urged contacts and the ratchet notch in a position to be engaged by the ratchet device for rotation of the rotor by the ratchet device to said circuit-breaking position; and index means to indicate the rotor adjustments.

2. In combination, an electrical circuit; a solenoid device; a switch operable by said solenoid device to open and close said circuit; a constantly driven time switch device to operate said solenoid device recurrently to open and close the circuit at predetermined times; pre-settable means to determine the time of solenoid operation by said time switch device; and a cut-off device operatively connected to the time switch device and to the solenoid device to control the operation of the solenoid device by the time switch device and operable by the solenoid device to prevent recurrent opening of the circuit by the time switch device and the solenoid device after a single opening and closing of the circuit.

3. In combination, an electrical circuit; a solenoid device; a switch operable by said solenoid device to open and close said circuit; a constantly driven time switch device to operate said solenoid device recurrently to open and close the circuit at predetermined times; pre-settable means to determine the time of solenoid operation by said time switch device; and a cut-off switch device operatively connected to the solenoid device and cooperable therewith and with the time switch device to control the opening of the circuit and being pre-adjustable to permit said regularly recurrent opening of the circuit and pre-adjustable to render it operable by the solenoid device to prevent recurrent opening of the circuit by the solenoid device after a single opening and closing of the circuit by the solenoid device.

4. A switch device for an electrical circuit, comprising a switch rotor, a mounting rotatably supporting said rotor, a pair of spaced circuit contacts, a circuit closer borne by the rotor to electrically connect said contacts to close the circuit in either of two rotative adjustments of the rotor and to open the circuit in another rotative adjustment of the rotor, a rockably mounted ratchet device, a ratchet shoulder on the rotor engageable by said ratchet device to rotate the rotor and located at a point around the rotor axis correlated with said circuit closer to dispose the ratchet shoulder out of reach of the ratchet device in its rocking movement when the rotor is in one of its said two circuit closing adjustments and to dispose the ratchet shoulder within reach of the ratchet device when the rotor is in the other of its said two circuit closing adjustments to permit the ratchet device to rotate the rotor and shift the circuit closer to circuit opening position, and means to rotate the rotor manually independently of the ratchet device to adjust the circuit closer to either of said two circuit closing positions.

5. A switch device for an electrical circuit, comprising a switch rotor, a mounting rotatably supporting said rotor, a pair of spaced circuit contacts, a circuit closer borne by the rotor to electrically connect said contacts to close the circuit in either of two rotative adjustments of the rotor and to open the circuit in another rotative adjustment of the rotor, a rockably mounted ratchet device, a ratchet shoulder on the rotor engageable by said ratchet device to rotate the rotor and located at a point around the rotor axis correlated with said circuit closer to dispose the ratchet shoulder out of reach of the ratchet device in its rocking movement when the rotor is in one of its said two circuit closing adjustments and to dispose the ratchet shoulder within reach of the ratchet device when the rotor is in the other of its said two adjustments to permit the ratchet device to rotate the rotor and shift the circuit closer to circuit opening position, means to rotate the rotor manually independently of the ratchet device to adjust the circuit closer to either of said two circuit closing positions and to said circuit opening position, and index means to indicate said adjustments of the circuit closer.

6. A switch device for an electrical circuit, comprising a switch rotor, a mounting rotatably supporting said rotor, a pair of spaced circuit contacts, a circuit closer borne by the rotor to electrically connect and disconnect said contacts to close and open the circuit in different rotative adjustments of the rotor, a rockably mounted ratchet device, a ratchet shoulder on the rotor disposed for engagement by said ratchet device in one rotative adjustment of the rotor to rotate the rotor and effect a switch movement of said circuit closer with relation to said contacts, and means to rotate the rotor manually independently of the ratchet device to dispose said ratchet shoulder out of reach of the ratchet device in its rocking movement to render the ratchet device ineffective to change the position of the circuit closer.

7. A switch device for an electrical circuit, comprising a switch rotor, a mounting rotatably supporting said rotor, a knob on the rotor to rotate it manually, a circuit closer at the rear of the knob and fixed to rotate with it, a pair of spaced circuit contacts shiftably mounted back of the knob and spring urged forward to engage the circuit closer, the circuit closer being adapted to electrically connect said contacts in either of two rotative adjustments of the rotor to close the circuit and to open the circuit in another rotative adjustment of the rotor, cooperating means on the circuit closer and on one of said contacts to yieldably lock the rotor in any one of said three adjustments, a rockably mounted ratchet device, a ratchet shoulder on the rotor engageable by said ratchet device to rotate the rotor and located at a point around the rotor axis correlated with said circuit closer to dispose the ratchet shoulder out of reach of the ratchet device in its rocking movement when the rotor is in one of its said circuit closing adjustments and to dispose the ratchet shoulder within reach of the ratchet device when the rotor is in the other of its said two circuit-closing adjustments to permit the ratchet device to rotate the rotor and shift the circuit closer to circuit opening position.

8. A switch device for an electrical circuit, comprising a switch rotor, a mounting rotatably supporting said rotor, a pair of spaced circuit contacts, a circuit closer borne by the rotor to electrically connect said contacts to close the circuit in either of two rotative adjustments of the rotor and to open the circuit in another rotative adjustment of the rotor, a rockably mounted ratchet device, a ratchet shoulder on the rotor engageable by said ratchet device to rotate the rotor and located at a point around the rotor axis correlated with said circuit closer to dispose the ratchet shoulder out of operative reach of the ratchet device in its rocking movement when the rotor is in one of its said two circuit closing adjustments and to dispose the ratchet shoulder within operative reach of the ratchet device when the rotor is in the other of its said two adjustments to permit the ratchet device to rotate the rotor and shift the circuit closer to circuit opening position, means to rotate the rotor manually independently of the ratchet device to adjust the circuit closer, and electrical means to operate the ratchet device.

9. In electrical apparatus, the combination with an intermittently operable electrical compressor motor; a constantly operable electrical timing motor; a control circuit; a timing means constantly operated by the timing motor and provided with manually adjustable contacts in said control circuit adapted to be arranged to close the control circuit at a pre-selected time and to maintain it closed for a pre-determined period of time and to then open it and to repeat that cycle of operation; an electrically operated switch in the compressor motor circuit to open and close the latter, the operating means of said switch being in said control circuit to operate the switch through said timing means for control of the opening and closing of the compressor motor circuit independently of the timing motor circuit, the switch being actuated when the control circuit is closed by the timing means to open the compressor motor circuit and hold it open until the control circuit is opened by the timing means and to then close the compressor motor circuit; a settable multi-position cut-off device in the control circuit and arranged to be operated through the timing means simultaneously with said switch; means in the cut-off device operating simultaneously with the circuit closing operation of said switch to open the control circuit and hold it open and to thereby render the timing means ineffective to again close the control circuit without a re-setting of the cut-off device; and means interposed in the compressor motor circuit and beyond the timing motor circuit and the control circuit to open and close the circuit of the compressor motor without interrupting the operation of the timing motor and without rendering said switch inoperable by the timing means.

10. In electrical apparatus, the combination with an intermittently operable electrical compressor motor; a constantly operable electrical timing motor; a control circuit; a timing means constantly operated by the timing motor and provided with manually adjustable contacts in said control circuit adapted to be arranged to close the control circuit at a pre-selected time and to maintain it closed for a predetermined period of time and to then open it and to repeat that cycle of operation; an electrically operated switch in the compressor motor circuit to open and close the latter, the operating means of said switch being in said control circuit to operate the switch through said timing means for control of the opening and closing of the compressor motor circuit independently of the timing motor circuit, the switch being actuated when the control circuit is closed by the timing means to open the compressor motor circuit and hold it open until the control circuit is opened by the timing means and to then close the compressor motor circuit; a settable multi-position cut-off device in the control circuit and arranged to be operated through the timing means simultaneously with said switch; and means in the cut-off device operating simultaneously with the circuit closing operation of said switch to open the control circuit and hold it open and to thereby render the timing means ineffective to again close the control circuit without a re-setting of the cut-off device.

11. In electrical apparatus, the combination with an intermittently operable electrical compressor motor; a constantly operable electrical timing motor; a control circuit; a timing means constantly operated by the timing motor and provided with manually adjustable contacts in said control circuit adapted to be arranged to close the control circuit at a pre-selected time and to maintain it closed for a predetermined period of time and to then open it and to repeat that cycle of operation; an electrically operated switch in the compressor motor circuit to open and close the latter, the operating means of said switch being in said control circuit to operate the switch through said timing means for control of the opening and closing of the compressor motor circuit independently of the timing motor circuit, the switch being actuated when the control circuit is closed by the timing means to open the compressor motor circuit and hold it open until the control circuit is opened by the timing means and to then close the compressor motor circuit; a settable multi-position cut-off device in the control circuit and arranged to be operated through the timing means simultaneously with said switch; means in the cut-off device operating simultaneously with the circuit closing operation of said switch to open the control circuit and hold it open and to thereby render the timing means ineffective to again close the control circuit without a re-setting of the cut-off device; and automatically operating means interposed in the compressor motor circuit and beyond the timing motor circuit and the control circuit to automatically open and close the circuit of the compressor motor without interrupting the operation of the timing motor and without rendering said switch inoperable by the timing means.

12. In electrical apparatus, the combination with an intermittently operable electrical compressor motor; a constantly operable electrical timing motor; a control circuit; a timing means constantly operated by the timing motor and provided with manually adjustable contacts in said control circuit adapted to be arranged to close the control circuit at a pre-selected time and to maintain it closed for a predetermined period of time and to then open it and to repeat that cycle of operation; an electrically operated switch in the compressor motor circuit to open and close the latter, the operating means of said switch being in said control circuit to operate the switch through said timing means for control of the opening and closing of the compressor motor circuit independently of the timing motor circuit, the switch being actuated when the control circuit is closed by the timing means to open the compressor motor circuit and hold it open until the control circuit is opened by the timing means and to then close the compressor motor circuit; a settable multi-position cut-off device in the control circuit and arranged to be operated through the timing means simultaneously with said switch; means in the cut-off device operating when said device is in one of its positions and actuated simultaneously with the circuit closing operation of said switch to open the control circuit and hold it open and to thereby render the timing means ineffective to again close the control circuit without a re-setting of the cut-off device, said means in the cut-off device in another position of said device rendering the cut-off device ineffective to interrupt the opening and closing of the control circuit and the operation of the switch by the timing means; and means interposed in the compressor motor circuit and beyond the timing motor circuit and the control circuit to open and close the circuit of the compressor motor without interrupting the operation of the timing motor and without rendering said switch inoperable by the timing means.

13. In electrical apparatus, the combination with an intermittently operable electrical compressor motor; a constantly operable electrical timing motor; a control circuit; a timing means constantly operated by the timing motor and provided with manually adjustable contacts in said control circuit adapted to be arranged to close the control circuit at a pre-selected time and to maintain it closed for a predetermined period of time and to then open it and to repeat that cycle of operation; an electrically operated switch in the compressor motor circuit to open and close the latter, the operating means of said switch being in said control circuit to operate the switch through said timing means for control of the opening and closing of the compressor motor circuit independently of the timing motor circuit, the switch being actuated when the control circuit is closed by the timing means to open the compressor motor circuit and hold it open until the control circuit is opened by the timing means and to then close the compressor motor circuit; a settable multi-position cut-off device in the control circuit and arranged to be operated through the timing means simultaneously with said switch; and means in the cut-off device operating when said device is in one of its positions and actuated simultaneously with the circuit closing operation of said switch to open the control circuit and hold it open and to thereby render the timing means ineffective to again close the control circuit without a re-setting of the cut-off device, said means in the cut-off device in another position of said device rendering the cut-off device ineffective to interrupt the opening and closing of the control circuit and the operation of the switch by the timing means.

14. In electrical apparatus, the combination with an intermittently operable electrical compressor motor; a constantly operable electrical timing motor; a control circuit; a timing means constantly operated by the timing motor and provided with manually adjustable contacts in said control circuit adapted to be arranged to close the control circuit at a pre-selected time and to maintain it closed for a predetermined period of time and to then open it and to repeat that cycle of operation; an electrically operated switch in the compressor motor circuit to open and close the latter, the operating means of said switch being in said control circuit to operate the switch through said timing means for control of the opening and closing of the compressor motor circuit independently of the timing motor circuit, the switch being actuated when the control circuit is closed by the timing means to open the compressor motor circuit and hold it open until the control circuit is opened by the timing means and to then close the compressor motor circuit; a settable multi-position cut-off device in the control circuit and arranged to be operated through the timing means simultaneously with said switch; means in the cut-off device operating when said device is in one of its positions and actuated simultaneously with the circuit closing operation of said switch to open the control circuit and hold it open and to thereby render the timing means ineffective to again close the control circuit without a re-setting of the cut-off device, said means in the cut-off device in another position of said device rendering the cut-off device ineffective to interrupt the opening and closing of the control circuit and the operation of the switch by the timing means; and automatically operating means interposed in the compressor motor circuit and beyond the timing motor circuit and the control circuit to automatically open and close the circuit of the compressor motor without interrupting the operation of the timing motor and without rendering said switch inoperable by the timing means.

15. In electrical apparatus, the combination with an intermittently operable electrical compressor motor; a constantly operable electrical timing motor; a control circuit; a timing means constantly operated by the timing motor and provided with manually adjustable contact means in said control circuit adapted to be arranged to close the control circuit recurrently at a pre-selected time; a switch in the compressor circuit to open and close said compressor circuit, means for urging said switch to closed position, electrically operated means for opening said switch, said electrically operated means of said switch being in said control circuit to operate the switch through said timing means for control of the opening of the compressor motor circuit independently of the timing motor circuit, the switch being actuated to open the compressor motor circuit when the control circuit is closed by the timing means; a settable multi-position cut-off device in the control circuit and arranged to be operated through the timing means simultaneously with said switch; means in the cut-off device operating simultaneously with the circuit-closing operation of said switch to open the control circuit and hold it open and to thereby render the timing means ineffective to again close the control circuit without a resetting of the cut-off device; and means interposed in the compressor motor circuit and beyond the timing motor circuit and the control circuit to open and close the circuit of the compressor motor without interrupting the operation of the timing motor and without rendering said switch inoperable by the timing means.

ROLAND R. NYDEGGER.